United States Patent [19]

Laesser et al.

[11] 4,371,821

[45] Feb. 1, 1983

[54] ELECTROMAGNETIC MOTOR ROTATABLE IN EITHER DIRECTION

[75] Inventors: Claude Laesser, La Chaux-de-Fonds; Roberto Zafferri, Lugano; Jean Depery, Neuchtel, all of Switzerland

[73] Assignee: Ebauches S.A., Neuchatel, Switzerland

[21] Appl. No.: 165,563

[22] Filed: Jul. 3, 1980

[51] Int. Cl.³ .............................................. G05B 19/40
[52] U.S. Cl. .................................. 318/696; 310/49 R; 318/297; 318/138
[58] Field of Search ....................... 318/696, 297, 138; 310/49, 40 M, 216

[56] References Cited

U.S. PATENT DOCUMENTS

| | | | |
|---|---|---|---|
| 3,439,200 | 4/1969 | Saito et al. | 318/696 X |
| 4,048,554 | 9/1977 | Nakajima et al. | 318/696 X |
| 4,055,785 | 10/1977 | Nakajima et al. | 318/696 |
| 4,066,947 | 1/1978 | Nakajima et al. | 318/696 |
| 4,127,802 | 11/1978 | Johnson | 318/696 |
| 4,144,467 | 3/1979 | Nakajima et al. | 310/49 R |
| 4,234,808 | 11/1980 | Geppert et al. | 318/696 X |

FOREIGN PATENT DOCUMENTS 2164815  6/1973  Fed. Rep. of Germany ........ 310/49

*Primary Examiner*—B. Dobeck
*Attorney, Agent, or Firm*—Silverman, Cass & Singer, Ltd.

[57] ABSTRACT

An electromagnetic stepping motor has a stator with an armature having the shape of an isosceles trapezoid the base of which is interrupted by a central gap and which is provided with three pole faces. The rotor comprises a permanent magnet. The stator comprises two coils one of which is located between a pole face opposite said gap and one of the other two pole faces. The other coil is located between the pole face opposite said gap and the other of said other two pole faces. When a current passes through the coils, the rotor is subjected to magnetic fields having directions which are oblique to each other and which are symmetrical with respect to a diameter of the rotor. The sense of the coil currents determines the sense of the fields. The arrangement is such that one can create in the zone of the rotor a resultant magnetic field which can extend in any one of four different directions dependent on the sense of the currents passing through the coils. By appropriate commutation of the sense of each of the two coil currents, one can cause the resultant magnetic field to rotate in one direction or in the other, to drive the rotor in one or the other directional sense, but always in the same direction for a given field rotation. Thus, the rotor rotates always in the desired direction, even if a rotational step is missed or if the rotor makes one rotational step too many.

17 Claims, 15 Drawing Figures

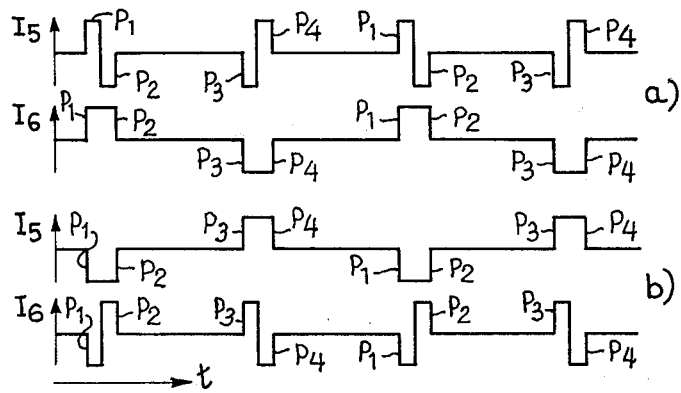
FIG. 5
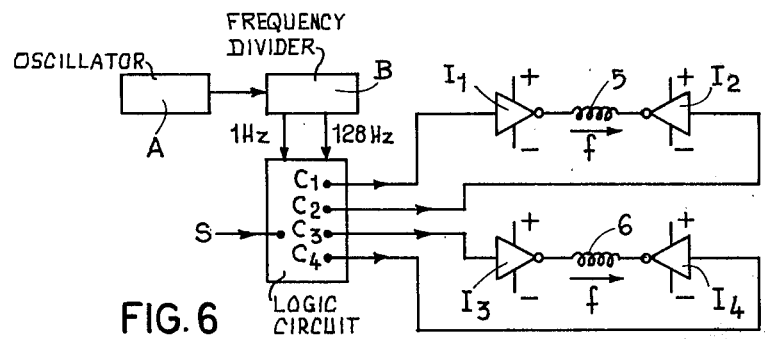
FIG. 6
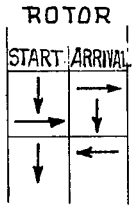
FIG. 7b
FIG. 7a
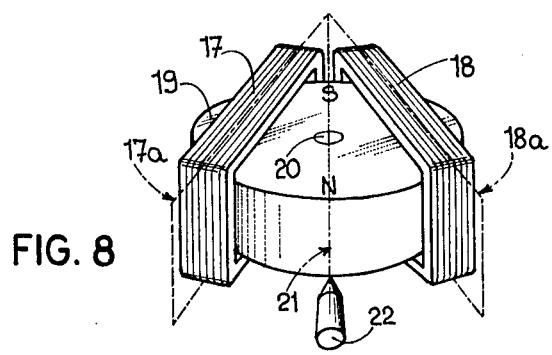
FIG. 8

ELECTROMAGNETIC MOTOR ROTATABLE IN EITHER DIRECTION

BACKGROUND OF THE INVENTION

1. Field of the Invention

This invention relates to an electromagnetic stepping motor operable in either direction of rotation.

2. Description of the Prior Art

French Pat. No. 2,209,251, for example, illustrates such a motor comprising two coils which are activated one after the other to produce rotation of the rotor of the motor in one directional sense or the other, by steps each of 180°. Each coil must be dimensioned so as to furnish, by itself, the energy necessary for this rotation, that is to say each coil must have the same volume as the coil of a conventional stepping motor which can rotate in only one directional sense.

Swiss patent application Ser. No. 10,768/71 illustrates a stepping motor operable in either direction of rotation and comprising only one coil, but the rotor in this case rotates by 360° at each step. This is is a drawback from the point of view of the mechanical arrangement since the step-down ratio between the motor and the members it drives is of importance.

U.S. Pat. No. 4,112,671 illustrates a stepping motor operable in either direction of rotation which comprises only one coil and the rotor of which rotates by only 180° at each step. An electronic circuit controls the rotation in one directional sense or the other. This type of motor has the serious drawback however that, if a step is by chance missed or if the motor makes one step too many, the direction of rotation is reversed.

SUMMARY OF THE INVENTION

The object of this invention is to overcome these drawbacks while furnishing an electromagnetic stepping motor operable in either direction of rotation and the rotor of which rotates by 180° for each step always in the desired sense, even after a step has been missed or after a step too many has been made. The motor has two coils which are simultaneously and not alternatively activated; consequently, these coils have a total volume which is substantially equal to the volume of the single coil of a uni-directional stepping motor.

This object is achieved by the present invention with a stator of the motor being arranged to subject the rotor to two magnetic fields respectively produced by two coils of the stator. The directions of these magnetic fields are oblique and substantially symmetrical with respect to a diameter of the rotor, or more generally with respect to a straight line intersecting the axis of rotation of the rotor. Preferably, the two magnetic fields are applied to the rotor by three enlarged pole faces surrounding the rotor, one of the said pole faces being common to the two coils and the other two respectively associated with each of the coils.

Other features of the invention will be apparent from the following description, drawings and claims, the scope of the invention not being limited to the drawings themselves as the drawings are only for the purpose of illustrating ways in which the principles of the invention can be applied. Other embodiments of the invention utilizing the same or equivalent principles may be used and structural changes may be made as desired by those skilled in the art without departing from the present invention and the purview of the appended claims.

BRIEF DESCRIPTION OF THE DRAWINGS

FIG. 5 is a diagram illustrating graphically the energizing current pulses passing through stator coils of the motor of FIGS. 1 to 4;

FIG. 6 shows a supply circuit of the coils of the motor;

FIGS. 7a and 7b respectively comprise tables summarizing the operation of this motor;

FIG. 8 diagrammatically illustrates a second embodiment of the invention;

DESCRIPTION OF THE PREFERRED EMBODIMENTS

Figure 1:
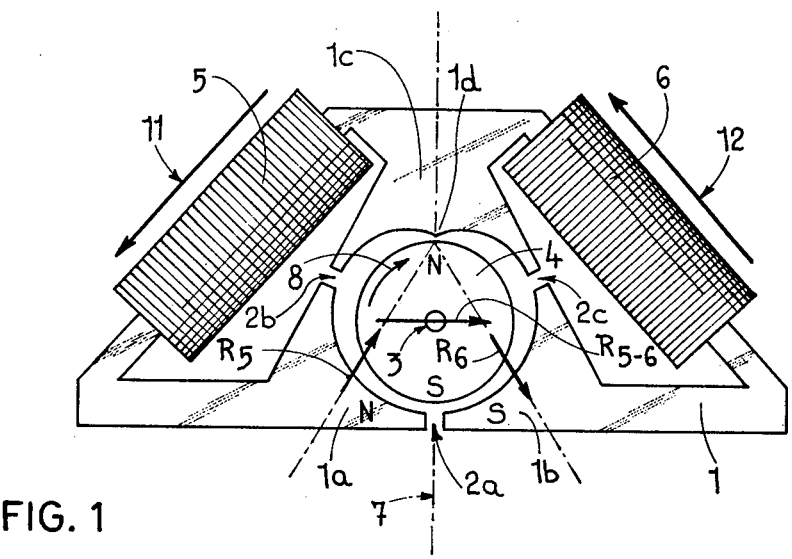
FIGS. 1 to 4 diagrammatically illustrate a motor representing a first embodiment of the invention, this motor being respectively shown in the four configurations of its operation.

The motor illustrated in FIGS. 1 to 4 comprises a stator 1 constituted by a member made of soft magnetic material presenting the general configuration of an isosceles trapezoid the base of which is interrupted with a gap provided by a slit at 2a. The two ends of this member constitute two arcuate pole faces one of which is designated 1a and the other 1b, while the portion opposed to the slit 2a provides an arcuate pole face 1c. These three pole faces are positioned, in this example, at an angular spacing of substantially 120° with respect to each other, about a point 3 constituting the center of a rotor 4 of the motor. These three pole faces further define two other silts, designated 2b and 2c. The rotor comprises a permanent magnet the poles of which are diametrically opposed and are designated N and S. The arcuate pole faces 1a, 1b and 1c, each extend over an angular zone slightly less than 120° in the example illustrated. However, the angular zones occupied by each of the poles faces could be substantially changed depending on the desired characteristics of the motor, its dimensions or the materials chosen for its construction. In any case, the angular zones occupied by the two pole faces 1a and 1b are substantially equal. The pole faces 1a and 1b have a shape so that the air gap between them and the rotor 4 has a variable width. This air gap is a minimum in the vicinity of the slit 2a and a maximum in the vicinity of the slits 2b and 2c. The pole face 1c has a shape such that the gap between it and the rotor 4 is also variable, there being a minimum at the middle 1d of the pole face 1c and two maxima in the vicinity of the slits 2b and 2c, respectively. The stator 1 has, as can be seen in FIG. 1, an axis of symmetry 7 passing through the middle 1d of the pole face 1c, through the axis 3 of the rotor 4 and through the middle of the slit 2a.

It is to be noted that the special shape of the pole face 1c results, in conjunction with the magnet of the rotor 4, in the formation of a positioning torque. This torque provides the rotor 4 with two stable balanced positions, in the absence of any magnetic field other than that of the magnet itself, which are respectively the two positions in which the poles N and S of the magnet are both situated on the axis of symmetry 7.

The stator 1 carries two coils 5 and 6 one of which is located between the pole faces 1a and 1c and the other between pole face 1c, which is thus common to the two coils, and the pole face 1b. When the coils 5 and 6 are energized by currents $I_5$ and $I_6$, they subject the rotor 4 to magnetic fields $R_5$ and $R_6$, respectively, the directions of which are substantially symmetrical with respect to a diameter of the rotor and which are mutually inclined, that is to say that the angle between the two directions is different from 0 and from 180°. The directions of these fields are advantageously mutually inclined at an angle of 90°. The sense of the currents $I_5$ and $I_6$ determines in each case the sense of the corresponding fields $R_5$ and $R_6$.

Four different conditions can occur:

1. When, as represented in FIG. 1, the currents $I_5$ and $I_6$ have a sense (which will be referred to later as the positive sense) such that, within the coil 5, the field is directed from the zone of the pole face 1c towards the zone of the pole face 1a (arrow 11) and that, within the coil 6, the field is directed from the zone of the pole face 1b towards the zone of the pole face 1c (arrow 12), these currents create outside the coils, fields $R_5$ and $R_6$ which are respectively directed from the pole face 1a towards the pole face 1c and from the pole face 1c towards the pole face 1b. The sense of these fields will also be referred to as positive. The resultant field $R_{5-6}$ transverses the zone of the rotor 4, at least to a first approximation, in a direction substantially perpendicular to the axis of symmetry 7 and is directed away from the pole face 1a, which plays the role of a North pole (N), towards the pole face 1b, which plays the role of a South pole (S).

Figure 2:
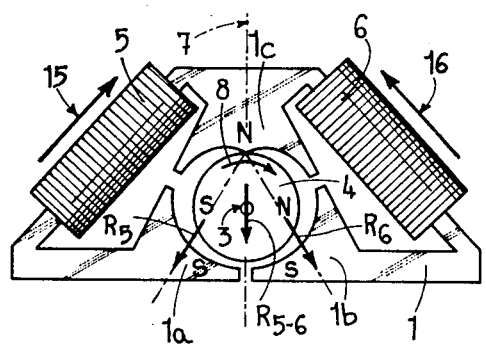

2. When, as represented in FIG. 2, the current $I_5$ has a sense which is inverse with respect to the positive sense as defined hereabove, that is to say when it is negative, the current $I_6$ still being positive, the fields created by these currents within the coils are directed respectively as indicated by the arrows 15 and 16. The resulting fields $R_5$ and $R_6$ outside the coils are consequently respectively directed from pole face 1c towards pole face 1a and from pole face 1c towards pole face 1b. The resultant field $R_{5-6}$ then passes through the region of the rotor 4 in a direction substantially parallel to the axis of symmetry 7 and is directed from the pole face 1c, which plays the role of a North pole (N), towards the pole faces 1a and 1b which together play the role of a South pole (S).

Figure 3:
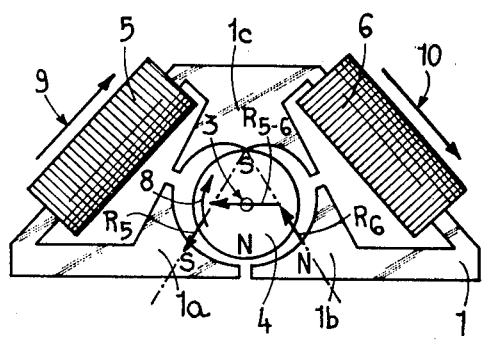

3. When, as represented in FIG. 3, the currents $I_5$ and $I_6$ are both negative, thus creating fields $R_5$ and $R_6$ directed as indicated by the arrows 9 and 10, the resultant field $R_{5-6}$ is directed, perpendicular to the axis of symmetry 7, from the pole face 1b, which thus plays the role of a North pole (N), towards the pole face 1c which thus plays the role of a South pole (S).

Figure 4:
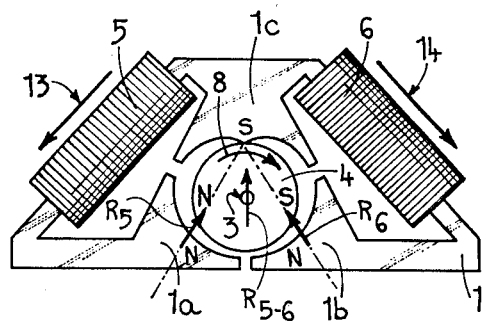

4. When, finally, as represented in FIG. 4, the current $I_5$ is positive and the current $I_6$ negative, thus creating fields $R_5$ and $R_6$ directed as indicated by the arrows 13 and 14, the resultant field $R_{5-6}$ is parallel to the axis 7 and is directed from the pole faces 1a and 1b, which together play the role of a North pole (N), towards the pole face 1c which plays the role of a South pole (S).

Consequently, it is seen that one can create, in the region of the rotor, a resultant magnetic field which can adopt any one of four different directions, depending on the sense of the energizing currents passing through the coils 5 and 6. By suitably commutating the sense of these two currents, this field can be rotated in either one direction or the other, in order to drive the rotor in the corresponding sense, as will be seen later.

It will be assumed, to start off with, that the rotor 4 is oriented as indicated in FIG. 1, that is to say with its North pole situated in the vicinity of the pole face 1c. To rotate the rotor 4 clockwise in the sense of the arrow 8, which will be referred to hereafter as the positive sense, it is sufficient to supply simultaneously to the two coils 5 and 6 positive currents $I_5$ and $I_6$ by means of a suitable electronic control circuit. The resulting field $R_{5-6}$ then acts on the magnet of the rotor so that its North pole goes closer to the pole face 1b. The torque thus created rotates the rotor in the positive sense subject to the condition, obviously, that the torque must be greater than the total of the positioning torque and of the frictional torque exerted on the rotor by the mechanical elements which the motor has to drive.

When the rotor 4 has rotated through about 90° and occupies approximatively the position represented in FIG. 2, the control circuit reverses the sense of the current $I_5$, which becomes negative, without changing the sense of the current $I_6$. Consequently, the field $R_{5-6}$ is then directed as indicated on FIG. 2, which creates a fresh torque, of the same sense as that mentioned above. As a result the rotor continues its rotation, still in the positive sense, until it occupies the position represented in FIG. 3, that is to say the position where its South pole is located in the vicinity of the pole face 1c. Thus, the rotor has effected a first step of 180° and the currents $I_5$ and $I_6$ can then be interrupted.

To cause the rotor 4 to effect a second step of 180°, the control circuit supplies negative currents into both the coils 5 and 6. Consequently, the resultant field $R_{5-6}$ has the direction represented in FIG. 3 and thus creates, with the magnet of the rotor 4, a torque which again drives this rotor in the positive sense.

When the rotor has rotated for about half a step, the control circuit reverses the current $I_5$ which becomes positive and the resulting field $R_{5-6}$ adopts the direction represented in FIG. 4. Consequently, the rotor 4 continues to rotate in the positive sense and ends its second step on 180°. The control circuit then interrupts the currents $I_5$ and $I_6$. The successive pulse forms of these currents are illustrated in FIG. 5a.

In order to cause the rotor to rotate in the opposite sense, referred to herein as negative, from the position represented in FIG. 1, the control circuit supplies negative currents into both the coils 5 and 6. Consequently, the field $R_{5-6}$ takes the sense it has in FIG. 3 and the rotor makes a first half-step of 90° in the negative sense. At this moment, the rotor is in the position represented in FIG. 4 and the control circuit reverses the sense of the current $I_6$, which thus becomes positive. The field $R_{5-6}$ is then directed as illustrated in FIG. 2. Consequently, the rotor continues its rotation in the negative sense until it has finished its second half-step and occupies the position illustrated in FIG. 3. The control circuit then interrupts the two curents $I_5$ and $I_6$.

In order to cause the rotor to make a fresh rotation of one step in the negative sense, the control circuit supplies both the coils 5 and 6 with positive currents $I_5$ and $I_6$. Consequently, the field $R_{5-6}$ takes the direction it has in FIG. 1 and the rotor rotates half a step in the negative sense. The control circuit then reverses the sense of the current $I_6$, which becomes negative, and the field $R_{5-6}$ takes the direction it has in FIG. 4. Consequently, the rotor terminates its step and is again in its starting position. Then the control circuit interrupts currents $I_5$ and $I_6$.

FIG. 5b illustrates the successive pulse forms of these currents.

In FIG. 5a, the graph illustrating currents $I_5$ and $I_6$ further illustrates the application of a current $I_5$ by way of a first pulse P1 having a first polarity and a second pulse P2 having a second polarity simultaneous with the application of current $I_6$ by way of first and second pulses P1 and P2 both having the same first polarity. Thereafter, current $I_5$ is applied by way of a third pulse P3 having the second polarity and a fourth pulse P4 having the first polarity simultaneous with the current $I_6$ being applied by way of third and fourth pulses P3 and P4 both of the second polarity.

In FIG. 5b, current $I_5$ is illustrated as being applied by first and second pulses P1 and P2 both having the second polarity simultaneous with current $I_6$ being applied with first pulse P1 of the second polarity and second pulse P2 of the first polarity. Thereafer, current $I_5$ is applied by way of third and fourth pulses P3 and P4 both of the first polarity simultaneous with current $I_6$ being applied with a third pulse P3 of the first polarity and a fourth pulse P4 of the second polarity.

FIG. 6 illustrates one example of a practical circuit enabling the coils 5 and 6 of the motor to be supplied with the pulses of energizing current represented in FIG. 5.

In this example, these pulses have a period of one second and a duration of 7.8 ms (millisecond).

Coils 5 and 6 are each connected to the outputs of two inverters $I_1$ and $I_2$, and $I_3$ and $I_4$ respectively, each constituted by two complementary MOS transistors. When the inputs of these inverters are at the same logic state, no current circulates in the coils 5 and 6. When the input of the inverter $I_1$ (or $I_3$) is at the logic state 0, while the input of the inverter $I_2$ (or $I_4$) is at the logic state 1, a current circulates in the coil 5 (or 6) in the sense indicated by the arrows f.

When the states of the inputs of the inverters $I_1$ and $I_2$, $I_3$ and $I_4$ respectively, are interverted, a current circulates in the corresponding coil in the reverse sense to that indicated by the arrow f.

A logic circuit C receives from a time base, constituted by an oscillator A and frequency divider B, two signals having respectively a frequency of 1 Hz and 128 Hz. It uses these two signals, as well as a signal S controlling the sense of rotation of the rotor, to furnish at each second to the inverters $I_1$ to $I_4$, which are connected to the outputs $C_1$ to $C_4$, the necessary logic states so that the desired currents circulate in the coils 5 and 6. The logic circuit C will not be described in more detail, since it can readily be designed without further description by a man skilled in the art in the exercise of a normal design function. It needs merely be noted that the signal at 1 Hz which the circuit receives determines the period of the pulses of current which circulate in the coils, and that the signal at 128 Hz determines their duration. As a matter of fact, the period of this last signal is equal to 7.8 ms.

The table 7a summarizes the complete operation of the motor. In this table, the positive currents are designated by the sign + and the negative currents by the sign −. The column entitled $R_{5-6}$ gives, for each combination of currents $I_5$ and $I_6$, the sense of the field they create in the rotor 4, such as are indicated in FIGS. 1 to 4. The two columns "Rotor start" and "Rotor arrival" also indicate, by means of arrows, the position of start and of arrival of the rotor 4. These arrows are directed from the South pole towards the North pole of the magnet of the rotor 4.

The present motor has the important advantage of always rotating in the desired sense, even if a step has been missed, or if the rotor has made one step too many. The table of FIG. 7b illustrates a case where, for any reason, the rotor 4 is in the position opposite to that in which it should have been at the moment corresponding to the first line of the table. When the control circuit sends the two currents $I_5$ and $I_6$ in the positive sense, the rotor 4 makes half a step in the negative sense. When the sense of the current 5 is reversed, it makes half a step in the positive sense and is again in its starting position which is precisely that in which it must be at this moment of the cycle. From this point on, it rotates in the desired sense. It can easily be seen that the rotor resumes, in all cases, the desired sense of rotation in a similar way, whatever this sense of rotation may be and whatever may be the moment of the cycle at which occurs the incident which brings this rotor again into an erroneous position.

It is obvious that, before being reversed at the end of a first half-step, each of the currents $I_5$ and $I_6$ could be interrupted for a time, the inertia of the rotor 4 then resulting in the rotor finishing this half-step and even starting the second half-step. Similarly, the currents $I_5$ and $I_6$ could be interrupted before the rotor 4 has effectively ended its full step. The positioning torque and the inertia of the rotor would then cause the rotor 4 to end its step. Similarly, the coils 5 and 6 could be short-circuited by the control circuit between the rotation steps in order to increase the positioning torque acting on the rotor and to dampen oscillation of the rotor about its balanced position at the end of the steps. The manner of employment of these measures, which results in an appreciable saving of energy, mainly depends upon the construction of the motor and upon the load it has to drive and has to be decided upon at the time of development of the whole arrangement with which the motor is to be associated.

It is still to be mentioned that, due to the fact that the two coils 5 and 6 are always fed simultaneously and hence jointly contribute to the formation of the magnetic field creating the torque applied to the rotor, the volume of the coils can be substantially reduced as compared with that of the prior coils which are alternatively fed; in other words, for a given total volume, the torque applied to the rotor can be substantially increased.

The modification of FIG. 8 distinguishes from the first embodiment by the fact that the stator is formed of only two coils, designated 17 and 18, the coils being constituted by two loop-like coils without an armature. The rotor 19 is arranged inside the coils 17 and 18 rotating round an axis 20. This axis is situated in the bissecting plane 21 of the median planes 17a and 18a of the two coils 17 and 18, respectively. A positioning element 22, made of magnetically soft material, orients the rotor so that, in the balanced position of the rotor, its North and South poles lie in the plane 21.

So far as the principle of operation of this modification is concerned, it is absolutely the same as that of the first embodiment.

Figure 9:
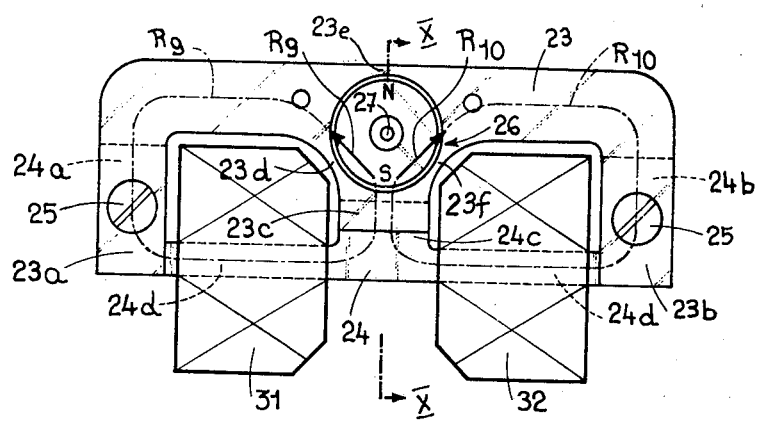
FIG. 9 is a view from above illustrating a third embodiment of the invention.
Figure 10:
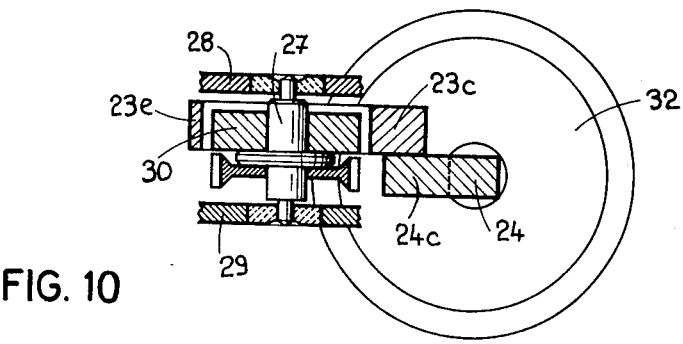
FIG. 10 is a sectional view, on the line X—X of FIG. 9, of said third embodiment of the invention.

According to the third embodiment illustrated in FIGS. 9 and 10, the motor comprises a stator the armature of which is formed of two elements made of magnetically soft material. One of these elements, designated 23, has the shape of a letter E the three branches of which are designated 23a, 23b and 23c, respectively. The other element, designated 24, has substantially the shape of a rectilinear bar presenting three transverse protrusions two of which, designated 24a and 24b, are situated at its ends, and the third of which, designated 24c, is situated at its middle portion. These two elements, 23 and 24, of the armature of the stator are disposed one with respect to the other in the relative positions, represented in the drawings, that is to say that they are positioned opposite one another. The branches 23a, 23b and 23c of the E-shaped element 23 are applied against the protrusions 24a, 24b and 24c, respectively, of the element 24 of the said stator. This assembly is maintained by two screws 25 one of which passes through the branch 23a and is threaded into the protrusion 24a, and the second of which passes through the branch 23b and is threaded into the protrusion 24b.

A circular hole 26 is provided in the E-shaped element 23, in the region of the root of the median branch 23c. This hole thus provides three reduced portions 23d, 23e and 23f, each having the shape of an isthmus interconnecting to each other an adjacent two of three pole faces. The first pole face is constituted by the branch 23c. The two other pole faces are constituted by the portions of the body itself of the element 23 situated between the thinner portion 23d and 23e, and 23e and 23f respectively.

The rotor of the motor comprises a shaft 27 pivotally mounted between two elements 28 and 29 of the frame of the apparatus, which may or may not be of a horological nature, equipped with the present motor. This shaft carries a permanent magnet 30 which is bipolar and the diametrically opposed poles of which have been indicated by N and S in FIG. 9.

The stator of the motor as described and illustrated comprises two coaxial coils 31 and 32 which are wound on the two rectilinear portions 24d of the element 24 of the armature. One coil 31 is situated between the protrusion 24a and the protrusion 24c of the element 24 and the other coil 32 is situated between the protrusion 24b and the protrusion 24c thereof. The magnetic fields produced by these coils in the armature have been represented diagrammatically in FIG. 9 where they are designated $R_9$ and $R_{10}$.

When they pass through the rotor 30, these two magnetic fields $R_9$ and $R_{10}$ are oblique with respect to each other and symmetrical with respect to the diameter of the rotor lying in the plane of the section X—X. The directions of these fields advantageously make an angle of 90° with respect to each other.

Depending upon the sense of the current which passes through the coils 31 and 32, the two fields $R_9$ and $R_{10}$ could be divergent, as indicated by the arrows of FIG. 9, in which case the resultant field, which is diametrical, will coincide with the plane of the section X—X and will be directed towards the top of FIG. 9. They could also be convergent, in which case the resultant field, which is again diametrical, will also coincide with the plane of the section X—X, but will now be directed towards the bottom of FIG. 9. They could also be directed in the opposite senses in which case the resulting torque will be diametrical, but perpendicular to the plane of section X—X in either one sense or the other.

Hence, by suitably commutating the sense of the two currents passing through the two coils 31 and 32, one can selectively cause the resultant field to rotate in one directional sense or the other, whereby to drive the rotor in the same sense. More generally, the operation of this third form of construction of a motor in accordance with the invention is identical to that of the first form of construction described herein.

It is to be noted that the fact the magnet 30 is bipolar while the armature of the stator has three pole faces determines a balance position of the rotor which is situated opposite the pole face situated between the isthmus 23d and 23f, that is to say the pole face through which the magnetic flux of the magnet 30 of the rotor follows the path having a minimum reluctance.

In the case of the motor of FIGS. 9 and 10, the two elements 23 and 24 of the armature are applied one against each other, these elements being placed in different planes as shown more particularly in FIG. 10. This arrangement is different in the case of the modification of FIGS. 11 to 13 where the two elements of the armature of the stator, now designated respectively 33 and 34, are situated in the same plane. Member 33, which has the shape of an E, is provided with three branches 33a, 33b and 33c while element 34, which is rectilinear, is provided with three protrusions 34a, 34b and 34c. The ends of the branches 33a and 33b are notched at 35, at half-thickness, while the protrusions 34a and 34b are notched at 36, also at half-thickness. The notched portions are applied against each other and are traversed by securing screws, designated 37, as shown in FIG. 11.

Figure 11:
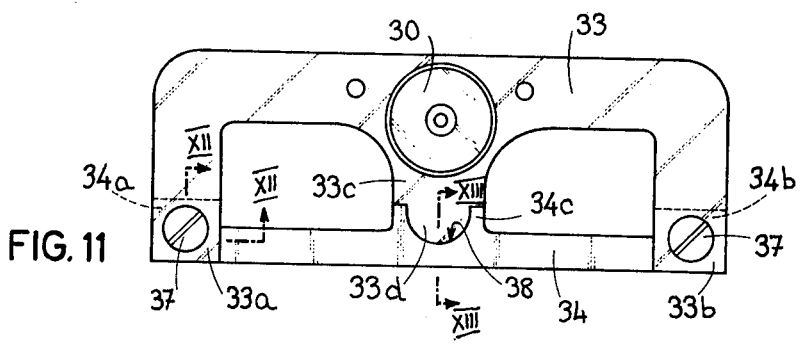
FIG. 11 is a plan view of a fourth embodiment of the invention.
Figure 12:
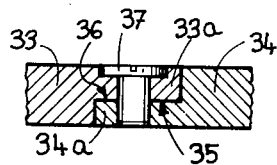
FIGS. 12 and 13 are vertical sectional views, taken respectively on the lines XII—XII and XIII—XIII of FIG. 10, of the fourth embodiment.
Figure 13:
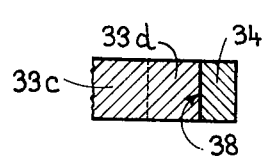

So far as the median branch and protrusion of the two elements 33 and 34 of the armature are concerned, they are not notched at half-thickness but the protrusion 34c is provided with a semi-circular notch 38 in which engages a protrusion of corresponding shape 33d of the median branch 33c of element 33 of the armature (FIGS. 11 to 13).

The coils of this modification have not been shown but they are identical with the coils 31 and 32 of the embodiment of FIGS. 9 and 10 and serve to drive the rotor 30 the same way as has been described in connection with the first form of construction.

Figure 14:
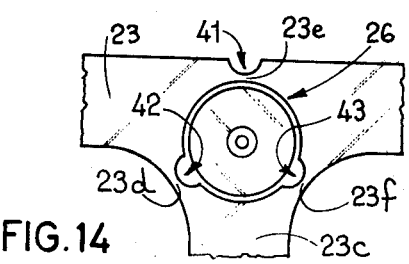
FIG. 14 is a view of a detail of FIGS. 8 and 10 showing a modification of pole faces thereof.

Finally, in FIG. 14 there is represented a modification of the armatures of the motors of FIGS. 9 and 11. According to this modification, notches 41, 42 and 43 are provided in the armature element 23 (or 33) in the thinner portions 23d to 23f thereof. The notches 42 and 43 open into the circular hole 26. These notches serve on the one hand for the positioning of the rotor and on the other hand for the magnetic separation of the pole faces.

We claim:

1. A bidirectional stepping motor comprising:
a rotor constituted by a permanent magnet mounted for rotation about an axis and providing a permanent magnetic field;
a stator including two and only two electrical coils, an armature including three and only three pole faces, said pole faces consisting of first, second and third pole faces arranged around said rotor, means for providing a first magnetic path connecting the first pole face to the second pole face and for mounting one of said two coils, and means for providing a second magnetic path connecting the first pole face to the third pole face and for mounting the other of said two coils; and
means for applying electrical pulses independently to each coil while controlling the polarity of said pulses, the polarity of said pulse determining the sense of the magnetic fields for reversibly controlling said rotor.

2. The motor of claim 1, wherein said pulses are applied to said two coils for applying simultaneously two magnetic fields to said rotor.

3. The motor of claim 2 wherein the direction of said two magnetic fields are mutually inclined at an angle of about 90°.

4. The motor of claim 1, wherein said armature includes an opening, the rotor being located in the opening, the armature further including three thin portions connecting said three pole faces together, and the three pole faces and said thin portions completely surrounding said opening.

5. The motor of claim 4, wherein the arrangement of the three pole faces is substantially symmetrical with respect to a straight line intersecting said axis of rotation and passing through said first pole face.

6. The motor of claim 5, wherein said first pole face comprises a central portion which is arranged close to the rotor for determining a balanced position of the rotor, and in which balanced position, said permanent magnetic field of said rotor is substantially directed along said line with respect to which said two magnetic fields are symmetrical.

7. A bidirectional stepping motor comprising:
a rotor constituted by a permanent magnet mounted for rotation about an axis providing a permanent magnetic field;
a stator including two electrical coils, an armature constituted by two elements one of which has the shape of a letter "E" defining three pole faces, and the other of which is substantially rectilinear and interconnects the three branches of the "E", said two coils being coaxial and respectively mounted on two portions of said rectilinear element of the armature, which two portions are respectively situated between corresponding ones of the extreme branches of the E-shaped element and the median branch of that element, the defined three pole faces being arranged around said rotor; and
means for applying electrical pulses, independently, to each coil and for controlling the polarity of said pulses.

8. The motor of claim 7 wherein said pulses are applied to said coils for applying simultaneously two magnetic fields to said rotor.

9. The motor of claim 2 or claim 9 wherein said rotor is rotated by two steps of 180° each in response to pulses having a first or a second polarity wherein the applying means apply:
to the first coil, a first pulse of the first polarity and a second pulse of the second polarity, and to said second coil, first and second pulses both having the first polarity, for producing a first step in a first direction of rotation;
to the first coil, a third pulse having the second polarity and a fourth pulse having the first polarity, and to said second coil, third and fourth pulses both having the second polarity, for producing the second step in said first direction of rotation;
to the first coil, first and second pulses both having the second polarity and to the second coil, a first pulse having the second polarity and a second pulse having the first polarity for producing a first step in a second direction of rotation; and
to the first coil, third and fourth pulses both having the first polarity and to said second coil, a third pulse having the first polarity and a fourth pulse having the second polarity for producing a second step in the second direction of rotation.

10. The motor of claims 7 or 8, wherein said three pole faces are adjacent the root of the median branch of the "E" shaped element.

11. The motor of claim 7 wherein the three pole faces define an opening of circular shape.

12. The motor of claim 11 wherein said armature further includes notches between said three pole faces communicating with said opening.

13. The motor of claim 9, wherein said three pole faces are adjacent the root of the median branch of said "E" shaped element.

14. The motor of claim 10 wherein the three pole faces define an opening of circular shape.

15. The motor of claim 13 wherein the three pole faces define an opening of circular shape.

16. The motor of claim 14 wherein said armature includes notches between said three pole faces communicating with said circular opening.

17. The motor of claim 15 wherein said armature includes notches between said three pole faces communicating with said circular opening.

* * * * *

UNITED STATES PATENT AND TRADEMARK OFFICE
CERTIFICATE OF CORRECTION

PATENT NO. : 4,371,821
DATED : February 1, 1983
INVENTOR(S) : LAESSER et al.

It is certified that error appears in the above–identified patent and that said Letters Patent are hereby corrected as shown below:

In the heading information, after the filing date, insert

-- /30/ Foreign Application Priority Data
      July 6, 1979 [CH] SWITZERLAND   6.331/79-9
      Dec. 12, 1979 [CH] SWITZERLAND  11.001/79-2--

Signed and Sealed this

Thirteenth Day of November 1984

[SEAL]

Attest:

GERALD J. MOSSINGHOFF

*Attesting Officer*      *Commissioner of Patents and Trademarks*